US009047824B2

(12) United States Patent
Jain et al.

(10) Patent No.: US 9,047,824 B2

(45) **Date of Patent: *Jun. 2, 2015**

(54) VIRTUALIZED DATA PRESENTATION IN A CAROUSEL PANEL

(71) Applicant: MICROSOFT CORPORATION, Redmond, WA (US)

(72) Inventors: Sonal Jain, Bothell, WA (US); Terry A. Adams, North Bend, WA (US); Mikhail Shatalin, Kirkland, WA (US); Hamid Mahmood, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/296,359

(22) Filed: Jun. 4, 2014

(65) Prior Publication Data

US 2014/0285529 A1 Sep. 25, 2014

Related U.S. Application Data

(63) Continuation of application No. 13/287,674, filed on Nov. 2, 2011, now Pat. No. 8,760,474.

(51) Int. Cl.

| | |
|---|---|
| ***G09G 5/00*** | (2006.01) |
| ***G09G 5/34*** | (2006.01) |
| ***G06F 3/0482*** | (2013.01) |
| ***G06F 3/0485*** | (2013.01) |
| ***G06F 3/041*** | (2006.01) |

(52) U.S. Cl.

CPC ................ *G09G 5/34* (2013.01); *G06F 3/0482* (2013.01); *G06F 3/0485* (2013.01); *G06F 3/041* (2013.01); *G09G 2354/00* (2013.01)

(58) Field of Classification Search

CPC ........................ G06F 2203/04802; G06T 3/20

USPC ................................................. 345/672–688

See application file for complete search history.

(56) References Cited

U.S. PATENT DOCUMENTS 6,037,937 A 3/2000 Beaton et al.

6,690,387 B2 2/2004 Zimmerman et al.

(Continued)

OTHER PUBLICATIONS

Okumura, et al., "Table-top Display System Which Enables to View from Four Directions for Group Work on Round Table", Proceedings of the International MultiConference of Engineers and Computer Scientists, vol. 1, Mar. 18-20, 2009, 6 pages.

(Continued)

*Primary Examiner* — Charles Tseng

(74) *Attorney, Agent, or Firm* — Jim Banowsky; Leonard Smith; Micky Minhas

(57) ABSTRACT

Embodiments are directed to displaying data items in a carousel display panel and to efficiently presenting virtualized data in a carousel display panel. In one example, a computer system accesses a list of data items that include at least a first data item and a last data item which are to be displayed in a carousel display panel. The computer system displays the selected portion of data items in the carousel display panel and receives a user input indicating that the last data item in the list is to be displayed in the carousel display panel. The computer system then rotates the data items displayed in the carousel display panel to the last data item. The last data item is thus displayed, along with at least a portion of a second-to-last data item and the first data item in the list.

16 Claims, 5 Drawing Sheets

Carousel Display Panel 510

Customizable Window

Virtualized Data Items 550

533 532

Item 8 Item 9 Item 10 Item 1 Item 2 Item 3 Item 4 Item 5

(56) References Cited

U.S. PATENT DOCUMENTS

| | | | |
|---|---|---|---|
| 7,188,316 | B2 | 3/2007 | Gusmorino et al. |
| 7,236,982 | B2 | 6/2007 | Zlatanov et al. |
| 7,761,812 | B2 | 7/2010 | Ostojic et al. |
| 8,140,990 | B2 | 3/2012 | Pedersen et al. |
| 8,261,205 | B2 | 9/2012 | Lee |
| 2008/0270949 | A1 | 10/2008 | Liang |
| 2008/0284782 | A1 | 11/2008 | Englerth |
| 2009/0089705 | A1 | 4/2009 | Panabaker et al. |
| 2009/0138801 | A1 | 5/2009 | Schober |
| 2009/0187859 | A1 | 7/2009 | Tuerk et al. |
| 2010/0281374 | A1 | 11/2010 | Schulz et al. |
| 2012/0081356 | A1 | 4/2012 | Flippov et al. |
| 2013/0106914 | A1 | 5/2013 | Jain et al. |

OTHER PUBLICATIONS

"Step Carousel Viewer v1.9" Available at least as early as Aug. 16, 2011, Available at <<http://www.dynamicdrive.com/dynamicindex4/stepcarousel.htm>>.

U.S. Appl. No. 13/287,674, Dec. 30, 2013, Office Action.

U.S. Appl. No. 13/287,674, Mar. 3, 2014, Notice of Allowance.

VIRTUALIZED DATA PRESENTATION IN A CAROUSEL PANEL

CROSS-REFERENCE TO RELATED APPLICATIONS

This application is a continuation of U.S. patent application Ser. No. 13/287,674 filed on Nov. 2, 2011, entitled "VIRTUALIZED DATA PRESENTATION IN A CAROUSEL PANEL," which issued as U.S. Pat. No. 8,760,474 on Jun. 24, 2014, and which application is expressly incorporated herein by reference in its entirety.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

Most software applications include a graphical user interface (GUI) that allows users to interact with the application. The GUI typically includes various different icons, menus, list boxes or other items that allows users to select and implement tools and settings. In some cases, software application GUIs may be configured to present data items that are available from a remote database. Those items are typically downloaded to the software application in bulk, and then made available to the user for browsing and selection.

BRIEF SUMMARY

Embodiments described herein are directed to displaying data items in a carousel display panel and to efficiently presenting virtualized data in a carousel display panel. In one embodiment, a computer system accesses a list of data items that include at least a first data item, a last data item, and potentially one or more intervening data items which are to be displayed in a carousel display panel. The computer system displays the selected portion of data items in the carousel display panel and receives a user input indicating that various data items including the last data item in the list are to be displayed in the carousel display panel. The computer system then rotates the data items displayed in the carousel display panel to the last data item. The last data item is thus displayed, along with at least a portion of a second-to-last data item and the first data item in the list.

In another embodiment, a computer system accesses a list of data items including at least a first data item and a last data item. The computer system accesses a corresponding carousel display panel policy to determine an appropriate panel size for the carousel display panel, wherein the panel size indicates how many data items are to be displayed in the panel. The computer system then loads into memory those data items that fit in the carousel display panel according to the policy-indicated panel size and displays at least a portion of those data items that were loaded into memory in the carousel display panel. Optionally, the computer system also receives a user input indicating that the last data item in the list is to be displayed in the carousel display panel. The computer system then rotates the data items displayed in the carousel display panel to the last data item. The last data item is thus displayed, along with at least a portion of a second-to-last data item and the first data item in the list.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Figure 1:
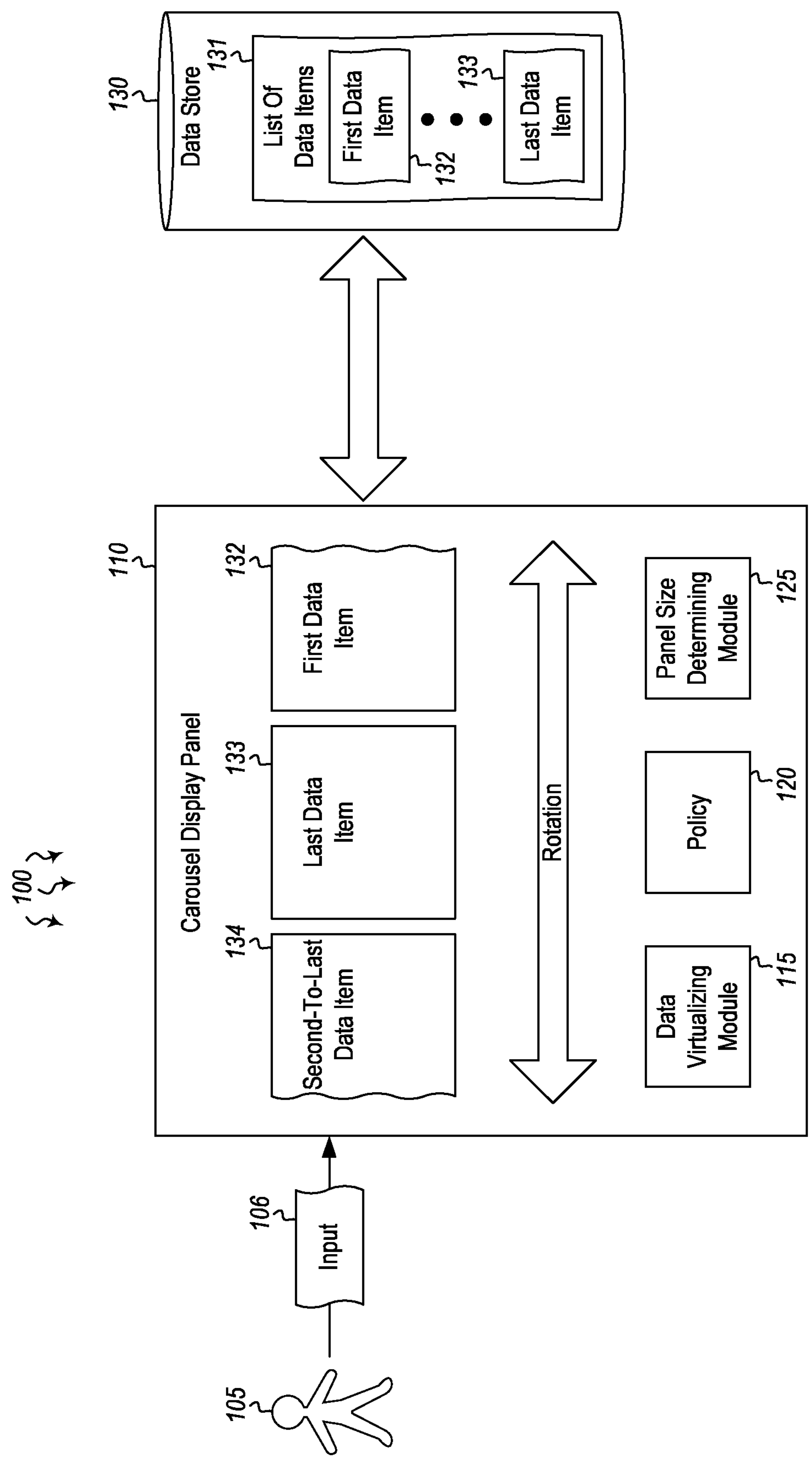
FIG. 1 illustrates a computer architecture in which embodiments of the present invention may operate including displaying data items in a carousel display panel and efficiently presenting virtualized data in a carousel display panel.

Embodiments described herein are directed to displaying data items in a carousel display panel and to efficiently presenting virtualized data in a carousel display panel. In one embodiment, a computer system accesses a list of data items that include at least a first data item and a last data item which are to be displayed in a carousel display panel. The computer system displays the selected portion of data items in the carousel display panel and receives a user input indicating that the last data item in the list is to be displayed in the carousel display panel. The computer system then rotates the data items displayed in the carousel display panel to the last data item. The last data item is thus displayed, along with at least a portion of a second-to-last data item and the first data item in the list.

In another embodiment, a computer system accesses a list of data items including at least a first data item and a last data item. The computer system accesses a corresponding carousel display panel policy to determine an appropriate panel size for the carousel display panel, wherein the panel size indicates how many data items are to be displayed in the panel. The computer system then loads into memory those data items that fit in the carousel display panel according to the policy-indicated panel size and displays at least a portion of those data items that were loaded into memory in the carousel display panel. Optionally, the computer system also receives a user input indicating that the last data item in the list is to be displayed in the carousel display panel. The computer system then rotates the data items displayed in the carousel display panel to the last data item. The last data item is thus displayed, along with at least a portion of a second-to-last data item and the first data item in the list.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes carousel display panel 110. The carousel display panel may be part of a software application or operating system running on a computer system. The computer system may be any type of local or distributed computer system including a cloud computing system. The computer may run a plurality of different software applications. Each application may have its own user interface. The user interface (UI) allows a user to interact with the software application. For instance, user 105 may send input 106 to a user interface to select various different icons, menus, toolbars, listboxes or other items on the UI. When selected, these items trigger certain types of functionality provided by the application.

In some cases, software applications (or an operating system) may display data items in a carousel fashion. For instance, carousel display panel 110 may display data items 134, 133 and 132. Data item 132 may correspond to a first data item in a list of data items 131. This list of data items may be stored on data store 130. Data store 130 may be a local data store that is on the same computer system as the carousel display panel, or may be a remote data store such as a database or other data server. The data items in the list of data items may be arranged in any of a number of different manners. For instance, the data items may be arranged alphabetically, by date, by type, by group or by any other form of organization. The data items are arranged in the list from the first data item 132 to the last data item 133.

When the carousel display panel initially displays the list of data items 131, typically the first data item will be displayed, followed by the second data item, and so on. The second data item may be placed to the right of the first data item, and the third data item to the right of the second, and so on. Eventually, after scrolling, swiping (e.g. with a gesture on a touchscreen), or otherwise navigating to the end of the list of data items, the last data item 133 will be displayed. In the carousel display panel 110, the first data item may be displayed seamlessly after the last data item. Thus, if a user were scrolling to the right to view the data items of the data list (so that the data items moved left-to-right on the screen), and the carousel display panel were configured to display three data items at a time, the carousel may display the first data item 132, the last data item 133 and the second-to-last data item 134. If the user were to scroll more to the right, the last data item would be displayed, followed by the first data item and then the second data item. Thus, the data items can be navigated seamlessly from the first to the last, in a carousel fashion. This process will be described in greater detail below with regard to methods 200 and 300 of FIGS. 2 and 3, respectively.

Figure 2:
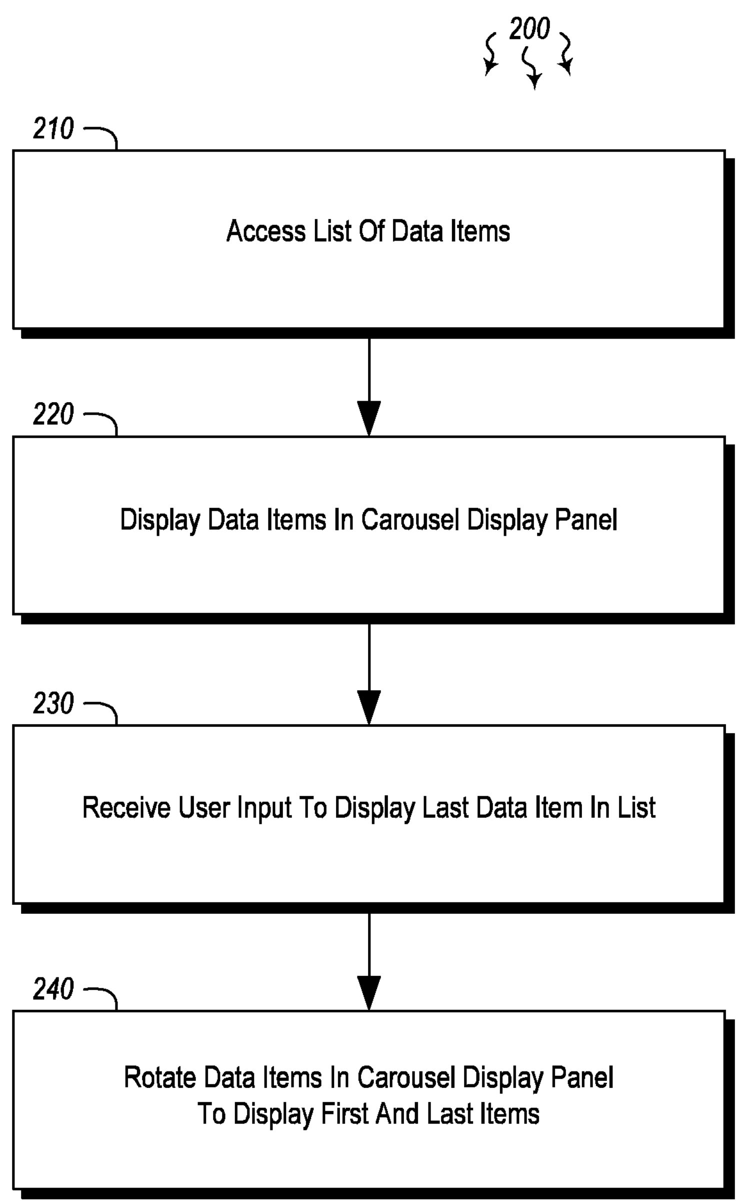
FIG. 2 illustrates a flowchart of an example method for displaying data items in a carousel display panel.
Figure 3:
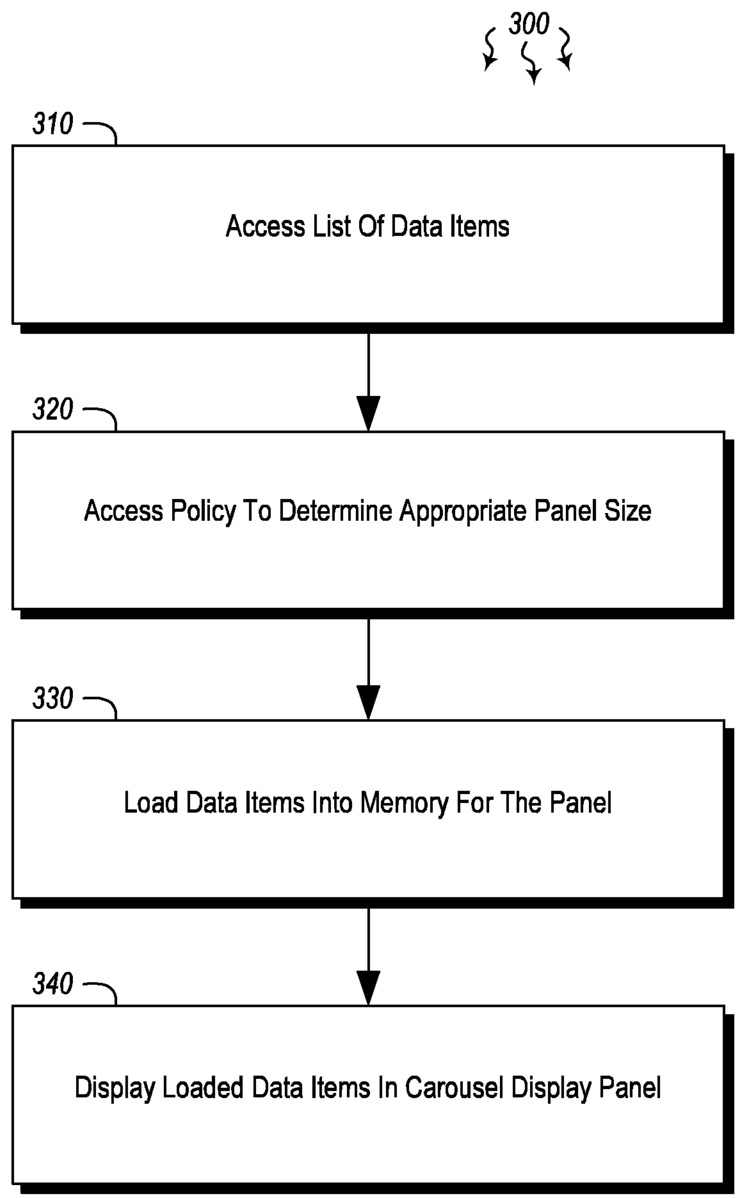
FIG. 3 illustrates a flowchart of an example method for efficiently presenting virtualized data in a carousel display panel.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for displaying data items in a carousel display panel. The method 200 will now be described with frequent reference to the components and data of environment 100.

Method 200 includes an act of accessing a list of one or more data items comprising at least a first data item and a last data item, wherein at least a selected portion of the data items are to be displayed in a carousel display panel (act 210). For example, the carousel display panel 110 may access the list of data items 131 which includes potentially any number of data items. The list of data items minimally includes a first data item 132 and a last data item 133. Some of the data items will be displayed on the carousel display panel. Those data items displayed in the carousel panel may include the first and/or last data items, or may include neither the first nor last data items and include only intervening data items. Any combination of first, last or intervening data items may be shown.

For instance, when the user 105 initially accesses the list of data items 131, the first and possibly the second data items are shown. As the user scrolls, swipes or provides other navigation inputs 106, the carousel display panel may move the data items left-to-right, bottom-to-top, or in any other manner that allows the user to navigate the data items. As indicated by the rotation arrow in the carousel display panel, the items may be rotated in any direction.

Method 200 includes an act of displaying the selected portion of data items in the carousel display panel (act 220). Thus, as mentioned above, the accessed data items may be displayed for the user 105 in the carousel display panel. The user may be able to touch and interact with the data items when the carousel display panel is displayed on a touchscreen. When displayed in a touchscreen, the user may swipe their finger right or left to rotate the carousel from left-to-right or from right-to-left. The carousel display panel may be part of an operating system, or may be integrated into a software application user interface. Accordingly, the data items may be operating-system-specific data items, or may be application-specific data items.

In embodiments where the carousel display panel 110 is displayed on a touchscreen, the velocity of the user's touchscreen input (i.e. the swipe) may be used to determine where in the list of data items the carousel display panel is to stop rotating. For instance, a high velocity swipe would cause the carousel display panel to be rotated at higher rate, and may increase the number of data items displayed (at least temporarily) proportional to the velocity of the swipe. Alternatively, a low velocity swipe would cause the carousel display panel to be rotated at a lower rate, and would decrease the number of data items displayed. The carousel display panel may slowly come to a stop on the data item to which the user navigated with the swipe. In some embodiments, the velocity of the user's touchscreen input may be used to determine which data items are realized into memory and which data items are to be unloaded from memory. Thus, as will be explained further below, only certain data items may be actually loaded into memory and displayed. Other data items (e.g. those that would be skipped due to a high velocity swipe) may not be virtualized (i.e. loaded into memory), thus saving processing and data transfer costs for those items.

Next, method 200 includes an act of receiving a user input indicating that the last data item in the list is to be displayed in the carousel display panel (act 230). Thus, for instance, the user 105 may navigate to the end of the data items in the list 131. The last data item 133 may then be displayed on the carousel display panel 110. Depending on how many data items are to be displayed at the same time, the last data item may be displayed between the second-to-last data item 134 and the first data item 132.

In some cases, many different data items will be displayed simultaneously. In such cases, the last data item would be place between data items 134 and 132, as well as the third-to-last data item, the second data item and others. The number of data items displayed (or partially displayed) in the carousel display panel may be customizable by the user. As such, the user may choose to have a large number of data items or a smaller number of data items being displayed at any one time. This number of data items may be dynamically adjusted and updated (up or down) while the data items are being displayed. It should also be noted that, at least in some cases, a separator item is displayed between the first data item and the last data items. The separator item may look like another data item, but may be blank and contain no information, or may be labeled as a separator item. Alternatively, a blank space or other item may be positioned between the first data item and the last data item to indicate to the user that the end of the list has been reached and has been started over from the beginning.

Method 200 also includes an act of rotating the data items displayed in the carousel display panel to the last data item, such that the last data item is displayed, along with at least a portion of a second-to-last data item and the first data item in the list (act 240). Accordingly, after receiving a navigation input indicating that the last data item in the list 131 is to be displayed, the carousel display panel 110 may display the last data item 133 between one or more other data items including items 134 and 132. In some cases, the carousel display panel may be rotated backwards from the first data item directly to the last data 132 item of the list of data items 131. Each data item may be dynamically realized into memory when the data item is to be displayed. Thus, at least in some cases, only data items that are to actually be displayed are dynamically realized into memory.

Figure 5:
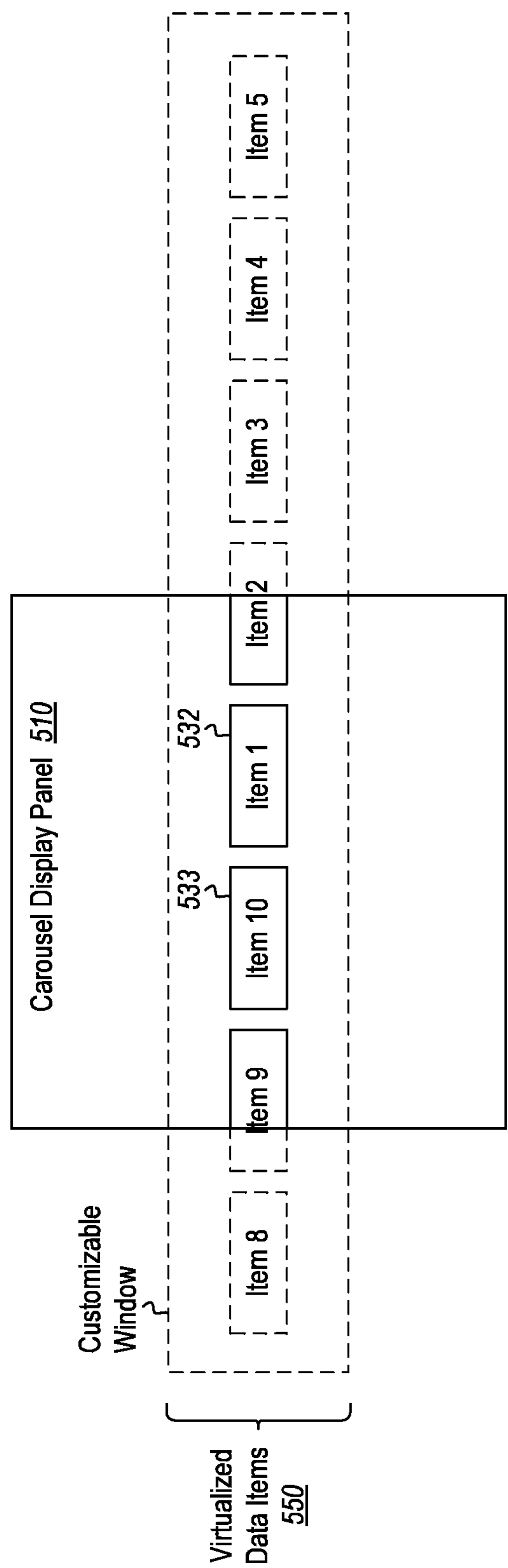
FIG. 5 illustrates an alternative embodiment of a carousel display panel.

The number of data items realized into memory may correspond to a customizable window that encompasses a specified number of contiguous data items. For instance, as shown in FIG. 5, the carousel display panel 510 may display multiple different data items (wholly or partially), including first data item (item 1) 531 and last data item (item 10) 533. The customizable window may include items 8, 9, 10, 1, 2, 3, 4 and 5. In this embodiment, these data items within the customizable window are virtualized 550 (or loaded into memory) by data virtualizing module 115. The customizable window includes a specified number of non-displayed data items (item 8) before the data items that are currently displayed and a specified number of non-displayed data items (items 3, 4 and 5) after the data items that are currently displayed on the carousel display panel. Those items not included in the customizable window (e.g. items 6 and 7) may be discarded.

The customizable window may be of an arbitrary size, and may be increased or decreased based on available processing resources, based on end-user or developer input, or based on an optimal size determined by analyzing past use. Furthermore, in some cases, the size of the customizable window may grow or shrink dynamically depending on the user's navigation inputs (e.g. very fast inputs may lead to a smaller window, while slower, more moderate inputs may lead to a larger window to ensure that data items are smoothly loaded as the user scrolls through the data items).

The customizable window may include more non-displayed data items to be displayed after the currently-displayed data items than displayed before the currently-displayed data items. These non-displayed items are preloaded or prefetched into memory to anticipate the user's navigation movements. Thus, for instance, it may be anticipated that the user will scroll through the items from left-to-right. Thus, fewer data items are preloaded on the left side of the carousel display panel, and more data items are preloaded on the right side of the carousel display panel.

FIG. 3 illustrates a flowchart of a method 300 for efficiently presenting virtualized data in a carousel display panel. The method 300 will now be described with frequent reference to the components and data of environment 100.

Method 300 includes an act of accessing a list of one or more data items comprising at least a first data item and a last data item, wherein at least a selected portion of the data items are to be displayed in a carousel display panel (act 310). For example, the carousel display panel 110 may access the list of data items 131. The first data item 132 will be displayed on the carousel display panel, along with at least a portion of a second data item. The carousel display panel may display substantially any number of data items, depending on the size of the data items, the size of the carousel display panel, and the size of the actual computer monitor or screen. Moreover, it should also be noted that the data store 130 may include substantially any number of lists of data items, and that the carousel display panel may display data items from substantially any number of lists. The data items from these lists may be displayed simultaneously or sequentially.

The carousel display panel may then access a corresponding carousel display panel policy 120 to determine an appropriate panel size for the carousel display panel (act 320). The panel size indicates how many data items are to be displayed at any one time in the display panel. In some cases, the policy may indicate that more data items are to be displayed in the panel (e.g. when the data items to be displayed are smaller). In other cases, the policy may indicate that fewer data items are to be displayed in the panel (e.g. when the data items to be displayed are larger). The policy may specify a different number of data items for each software application, or for each user. Moreover, the number of partially-displayed data items may also be specified in the policy, or the policy may indicate that partially-displayed data items are not to be shown.

Method 300 next includes an act of loading into memory those data items that fit in the carousel display panel according to the policy-indicated panel size (act 330). Thus, based on the determined size of the carousel display panel 110 according to the policy, those data items that are to be displayed are loaded into memory by data virtualizing module 115. As indicated above, those data items that fit within a customizable window (as shown in FIG. 5) may be virtualized, in addition to those items that are actually displayed in the display panel. The carousel display panel then displays at least a portion of those data items that were loaded into memory in the carousel display panel (act 340). The carousel display panel may be arranged in various different manners including horizontally and vertically.

Figure 4A:
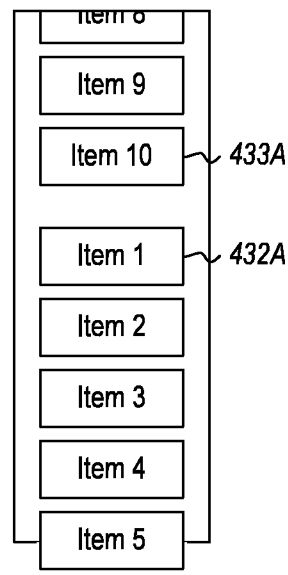
FIGS. 4A and 4B illustrate embodiments of a carousel display panel.

For example, as shown in FIG. 4A, carousel display panel 410A may be arranged in a vertical manner. The carousel display panel may display various data items, either fully or partially. The carousel display panel of FIG. 4A illustrates a scenario where the list of data items 131 includes ten data items. Items 1, 2, 3, 4, 9 and 10 are fully displayed, while data items 5 and 8 are partially displayed. Items 6 and 7 are not displayed and, at least in some cases, may not be virtualized. A space (potentially designed to look like a missing item) may be placed between the first item of the list (item 1) 432A and the last item of the list (item 10) 433A. The space may indicate to the user that the end of the list has been reached, and that the first of the list has wrapped back around.

Figure 4B:
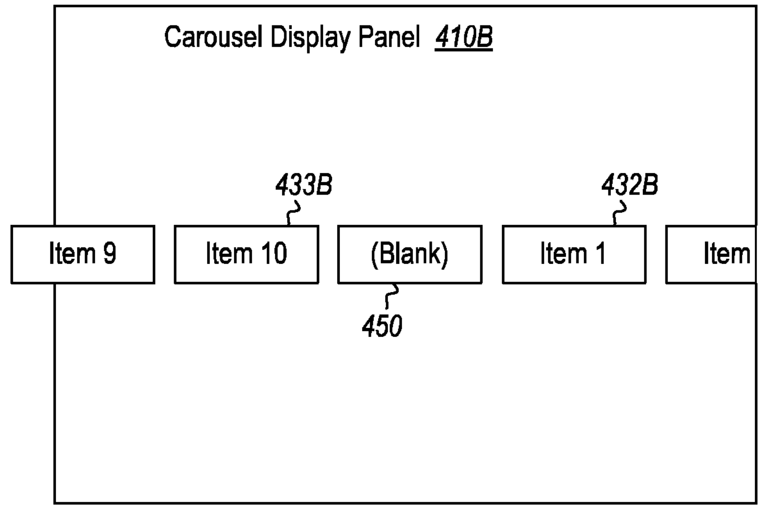

In FIG. 4B, the carousel display panel 410B is arranged horizontally. Data items 1 and 10 are fully displayed, while data items 2 and 9 are partially displayed. A blank item 450 may be inserted between the first item of the list (item 1) 432B and the last item of the list (item 10) 433B. The blank item may indicate to the user 105 that the end of the list has been reached, and that the first of the list has wrapped back around. In some embodiments, a user input 106 may be received indicating that the last data item in the list of data items 131 is to be displayed in the carousel display panel 410B. The data items may then be rotated to the last data item so that the last data item is displayed, along with at least a portion of a second-to-last data item (item 9) and the first data item in the list according to a policy-indicated panel size. As the carousel display panel is rotated, data items may be continually and dynamically loaded and unloaded from memory (e.g. as items fall in and out of the customizable window). When the user stops providing navigation inputs, the carousel display panel stops on the next appropriate data item. This data item may be snapped into a spatially centered position to assist in providing an aesthetically appealing display.

Accordingly, methods, systems and computer program products are provided which display data items in a carousel display panel. Moreover, methods, systems and computer program products are provided which efficiently present virtualized data in a carousel display panel.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer hardware storage devices having stored computer-executable instructions which, when executed by a computer system including at least one processor, implement a method for displaying data items in a carousel display panel, the method comprising:

an act of accessing a list of one or more data items, wherein at least a selected portion of the data items are to be displayed in a carousel display panel;

an act of displaying the selected portion of data items in the carousel display panel, the selected portion of data items being loaded into memory with a first set of one or more data items that were displayed previously in the carousel display panel prior to being rotated out of view to a first side of the carousel display as part of a first rotation of the carousel display panel;

an act of loading one or more additional data items into memory in anticipation of a user navigation comprising a second rotation of the carousel display panel, wherein the one or more additional data items loaded into memory include:

a second set of data items that will be displayed after the second rotation occurs, which is located on a second side of the carousel display panel in the direction of the anticipated user navigation, wherein a quantity of the second set of data items loaded into memory corresponding to the direction of the anticipated user navigation is greater than a quantity of the first set of one or more data items loaded in memory and that were displayed prior to the first rotation; and an act of rotating the data items displayed in a direction of the anticipated user navigation.

2. The computer program product of claim 1, wherein the carousel display panel is integrated into a software application user interface.

3. The computer program product of claim 2, wherein the software application user interface allows user touchscreen inputs to rotate the carousel display panel.

4. The computer program product of claim 3, wherein the velocity of the user's touchscreen input is used to determine where the in the list of data items the carousel display panel is to stop rotating.

5. The computer program product of claim 3, wherein the velocity of the user's touchscreen input is used to determine which data items are to be unloaded from the memory.

6. The computer program product of claim 1, wherein data items included in the customizable window are prefetched.

7. The computer program product of claim 1, wherein as the carousel display panel is rotated, data items are continually and dynamically loaded and unloaded from memory.

8. The computer program product of claim 1, wherein the rotating carousel display panel stops on given data item which is snapped into a spatially centered position.

9. A computing system comprising:

one or more processors;

system memory; and one or more computer-readable storage media having stored thereon computer-executable instructions that, when executed by the one or more processors, causes the computing system to perform a method for efficiently presenting virtualized data in a carousel display panel, wherein the method includes the following:

an act of accessing a list of one or more data items, wherein at least a selected portion of the data items are to be displayed in a carousel display panel;

an act of displaying the selected portion of data items in the carousel display panel, the selected portion of data items being loaded into memory with a first set of one or more data items that were display previously prior to a rotation of the carousel display panel, the first set of data items having been rotated out of view on a first side of the carousel display panel;

an act of loading a second set of data items into memory, the second set of data items corresponding to a second side of the carousel display panel, the second set of data items having not yet been displayed prior to the rotation of the carousel display, wherein a quanity of the second set of data items loaded into memory corresponding to the second side of the carousel display panel and which have not yet been displayed is greater than a quanity of the first set of one or more data items loaded in the momory and that were displayed prior to the rotation; and an act of rotating the data items displayed in the carousel display panel so as to display at least one or more of the second set of data items.

10. A computer system comprising the following:

one or more processors;

system memory;

one or more computer-readable storage media having stored thereon computer-executable instructions that, when executed by the one or more processors, causes the computing system to perform a method for efficiently presenting virtualized data in a carousel display panel, the method comprising the following:

an act of accessing a list of one or more data items comprising at least a first data item and a last data item, wherein at least a selected portion of the data items are to be displayed in a carousel display panel;

an act of accessing a corresponding carousel display panel policy to determine a policy-indicated panel size for the carousel display panel, wherein the policy-indicated panel size indicates how many data items are to be displayed in the panel;

an act of loading into memory those data items that fit in the carousel display panel according to the policy-indicated panel size;

an act of displaying at least a portion of those data items that were loaded into memory in the carousel display panel;

an act of rotating the data items displayed in the carousel display panel in response to user input; and defining a customizable window that includes additional data items that are to be loaded into memory with the currently displayed data items, the customizable window being sized to include:

all of the data items currently displayed in the display panel;

a first set of one or more data items that were displayed previously, before the act of rotating occurred, which first set is located on a first side of the carousel display panel that is opposite a direction of a new anticipated rotation; and a second set of one or more data items that will be displayed after the anticipated new rotation occurs, which is located on a second side of the carousel display panel in the direction of the anticipated new rotation, wherein the second set of one or more data items loaded into memory corresponding to the direction of the anticipated new rotation is greater than the first set of one or more data items loaded into memory.

11. The computer system of claim 10, wherein the first set of one or more data items includes a plurality of data items.

12. The computer system of claim 11, wherein the carousel display panel is integrated into a software application user interface.

13. The computer system of claim 12, wherein the software application user interface allows user touchscreen inputs to rotate the carousel display panel.

14. The computer system of claim 13, wherein the velocity of the user's touchscreen input is used to determine where the in the list of data items the carousel display panel is to stop rotating.

15. The computer system of claim 13, wherein the velocity of the user's touchscreen input is used to determine which data items are to be unloaded from the memory.

16. The computer system of claim 10, wherein the rotating carousel display panel stops on given data item which is snapped into a spatially centered position.

* * * * *